United States Patent
Padovani

[11] 3,912,438
[45] Oct. 14, 1975

[54] CONTAINER MANUFACTURING APPARATUS

[76] Inventor: Pietro Padovani, 2, Lungadige Matteotti, Verona, Italy

[22] Filed: Feb. 5, 1974

[21] Appl. No.: 439,834

Related U.S. Application Data

[62] Division of Ser. No. 223,945, Feb. 7, 1972, Pat. No. 3,825,166.

[30] Foreign Application Priority Data
Feb. 13, 1971 Italy .................................. 84912/71

[52] U.S. Cl. ............... 425/292; 425/324 R; 425/383
[51] Int. Cl.² .......................................... B29C 17/08
[58] Field of Search ........... 425/324, 383, 406, 410, 425/292, DIG. 58

[56] References Cited
UNITED STATES PATENTS

| | | |
|---|---|---|
| 1,935,832 | 11/1933 | Lackner .................................. 93/51 |
| 3,011,212 | 12/1961 | Marshall et al. ............. 425/DIG. 58 |
| 3,173,174 | 3/1965 | Edwards ............................. 425/292 |
| 3,260,781 | 7/1966 | Lux et al. ......................... 425/388 X |
| 3,338,997 | 8/1967 | Tigner ............................. 425/324 X |
| 3,357,053 | 12/1967 | Lyon et al. ....................... 425/324 X |

Primary Examiner—Robert L. Spicer, Jr.
Attorney, Agent, or Firm—Steinberg & Blake

[57] ABSTRACT

The invention provides a deep drawing and moulding apparatus for forming lipped containers such as cups from softened thermoplastics sheet. The mould is in two parts. The upper rim of the lower part forms the upper part of the container. The lower rim of the upper part, during mould closure, clamps the upper part of the container against the lower part of the mould, and bends over outwards and thickens a rim portion of the thermoplastics sheet to form a lip. The last part of the mould movement brings together two cutting parts of the mould, one on the upper and one on the lower part, to trim the lip.

4 Claims, 12 Drawing Figures

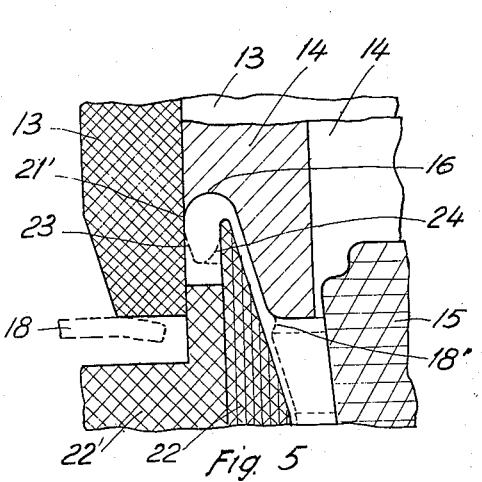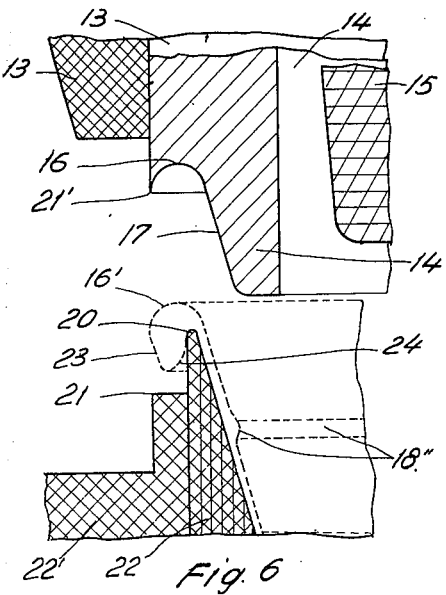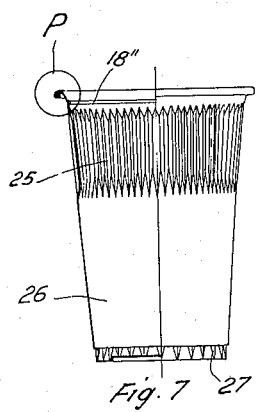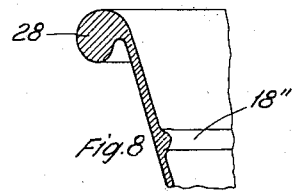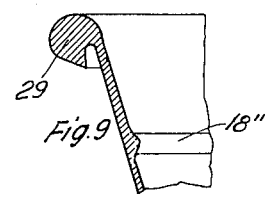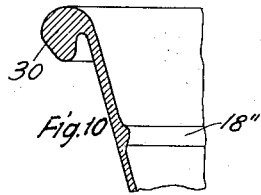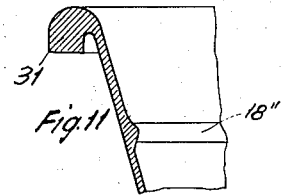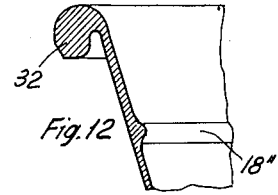

CONTAINER MANUFACTURING APPARATUS

CROSS REFERENCE TO RELATED APPLICATION

This application is a division of copending application Ser. No. 223,945, filed Feb. 7, 1972, now U.S. Pat. No. 3,825,166 and entitled CONTAINER HAVING AN OPEN TOP SURROUNDED BY A LIP.

The present invention relates to apparatus for moulding an encircling torus or lip on the edge of an open-topped container during the manufacture thereof from a thermoplastics sheet.

Containers made from sheets and having flanged-over edges are known; the edges serving to stiffen the container against lateral compressive stresses. The thickness of these flanged-over edges is normally equal to the thickness of the sheet used to produce the container. Consequently, the reinforcing of the cup edge against lateral compressive stresses is not very great and the flanged-over edges often fracture when such stresses are exerted thereon.

The present invention is to be used to mould an edge torus or lip on such a container, and more particularly on an inverted frusto-conical cup or the like of thermoplastic material, and to provide an edge which will withstand considerably greater compressive stresses than known flanged-over edges. This object is attained in accordance with the invention in that during moulding of the container, the apparatus exerts pressure on both sides of the upper edge region of the container, and thermoplastic material squeezed-out thereby in an upward and in radially outward direction is prevented to form a thickening of the sheet, the sheet at the edge of the thickening being drawn downwards, subjected to elongation, and subsequently severed at this point.

By accumulating the squeezed-out material at the upper edge of the container, a thickening is at first produced in the still plasticized state of the material; this is subsequently elongated and, in the elongated state, is severed from the remainder of the sheet. Due to the partial cooling-off occurring in the meantime, the natural resilience or elasticity of the thickening becomes so high that it contracts to form a lip extending outwardly and downwardly and having a solid cross-section, the thickness of which is greater than the thickness of the sheet used for its production.

The apparatus is particularly useful in the production of a container in the form of an inverted frusto-conical cup or beaker having inclined walls of preferably constant thickness. Such a cup is substantially more stable whilst at the same time simpler and cheaper to produce than known cups or containers with flanged over edges in the form of flat or arcuate flanges. By squeezing-out the material into the thickening which forms the lip, the expenditure in material is substantially no greater than in known edge arrangements. The known flanged-over edges are mostly moulded-on after producing the container itself. This additional operation is omitted in the method in accordance with the invention, since the lip may be moulded on directly during production of the cup of thermoplastics foil. For this purpose merely a single moulding tool is required, so that machine costs may also be lowered.

The downward facing side of the lip which is formed after severing the foil from the thickening and whilst it is still in a readily plasticized state, may be upset thereon by a suitable tool of optional shape. This shaping may further increase the rigidity of the lip.

The apparatus of the invention is characterised by a lower mould part which in operation abuts against the outer surface of the upper wall region of the container and at the same time forms the matrix of the tool for moulding the whole container, an upper mould part axially displaceable relative the lower mould part and which in operation abuts against the inside surface of the upper wall region of the container, the upper mould part having a downwardly facing recess which overlaps the upper edge of the lower mould part, a normally stationary cutter located on the outer surface of the lower mould part having a cutting edge, and an axially displaceable cutter located on the outer surface of the lower mould part also having a cutting edge, whereby the cutting edge of the first mentioned cutter and the outer edge of the upper mould part in their position of closest proximity to each other form a cutting opening having a height which is greater than the thickness of the sheet used as starting material.

The container itself is formed by deep-drawing the clamped sheet in a matrix mould and subsequently applying excess or reduced pressure to intimately mould the sheet, plasticized by heat, against the matrix. This operation, however, only indirectly concerns the invention and is therefore not described in detail.

To provide the moulded on lip with an expedient shape, the section of the outer surface preferably located between the cutting opening and above the normally stationary cutter extending substantially in an axial direction of the lower mould part, may form a chamber in the position at which the stationary cutter and the upper mould part are at their closest proximity to each other; the dimension of the chamber in a radial direction being greater than the thickness of the sheet. This shaping of the cutting opening and the chamber located behind it, firstly enables the production of a thickening of the thermoplastic material squeezed-out between the mould sections, and secondly permits elongation of this thickening within the chamber due to moving the displaceable cutter downwards until the cutting edges of both cutters sever the remainder of the foil adjacent to the thickening. Thus, only the outer and upper surface of the thickening comes into contact with a tool whilst the inner and lower surface of the thickening, owing to the section of the outer surface of the lower mould section extending in an axial direction, does not come into contact with any of the moulding tools. After severing therefore the thickening due to its inner elasticity, tends to be as flatly defined as possible within the surface which has come into contact with displaceable cutter, whilst the surface parts which do not come into contact with any tool at all, tend to contract into a substantially circular cross-section.

The final shape of the lip, if required, can also be formed in the still plasticized state by a suitable upsetting tool, whereby the normally stationary cutter preferably at the outer surface of the lower mould section, is axially displaceable after severing the foil, and the upper surface adjacent to the cutting edge is formed as an upsetting tool of a shape particularly suitable for the given shape of the cup. The normally stationary cutter is actually stationary during the moulding of the lip, but may subsequently be axially displaced.

For further reinforcement of the edge of the container or cup the surface of the upper mould section abutting on the inside surface of the upper wall region of the cup may be bent inwards at the lower end of this wall region. This also causes some foil material to be squeezed-out downwardly, so that an annular thickening is produced at a lower end portion of the upper wall region of the container or cup carrying the lip. This thickening also contributes to the reinforcing against pressure stresses.

The invention will be described further, by way of example, with reference to the accompanying drawings, in which:

FIGS. 1 to 6 are partial axial sections through moulding apparatus sections required for carrying out the method of the invention and shown during successive steps of the method;

FIG. 7 is an axial section in the left-hand half thereof and a side view in the right-hand half thereof, of a cup having a lip moulded thereon; and FIGS. 8 to 12 are enlarged partial sections through upper wall regions of cups made of thermoplastics sheet showing various embodiments of the moulded-on lip.

Figure 1:
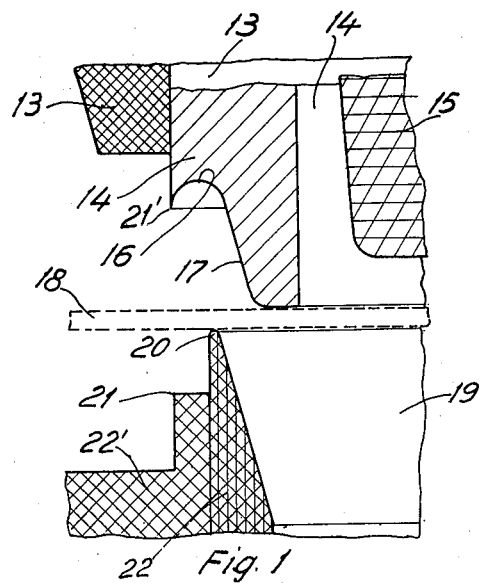

Identical or corresponding parts are provided with identical reference numerals in the drawings. FIG. 1 shows a level foil or sheet 18 of thermoplastic material which has been brought to the temperature necessary for moulding a container and has been subsequently passed between a lower mould part 22, a tension or clamping element 15, an upper mould part 14 and a cutter 13, without making contact with these parts. As known from conventional moulding methods, the clamping element 15 elongates the material and, as shown at position 18', causes it to become thin-walled in the direction towards the base (not shown) of the cavity 19 of the lower mould part 22.

Figure 3:
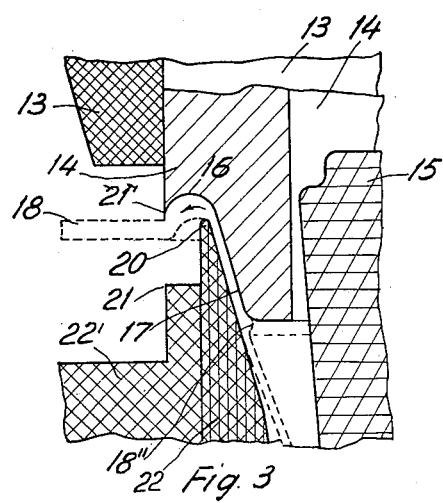
Figure 2:
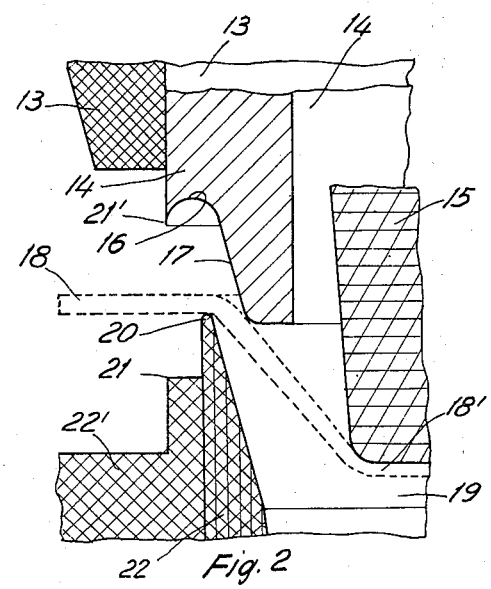

The upper mould part 14 is lowered, at an expediently selected speed in the direction towards the lower mould part 22 until, by means of its conical surface 17, it presses the material against the tapering wall of the upper part of the cavity 19 (FIG. 3). The pressure exerted by the surface 17 causes a proportion of the material of the sheet to flow out over the upper edge 20 of the lower mould part in the direction of the arrow to the point where the annular recess 16 conducts the material from the mould part 14 into the region at which the lip is formed and which is located between the edge 20 of the mould part 22 and the outer edge or rim 21' of the mould part 14 with a resultant thickening of the sheet in this region. At the same time, the upper mould part causes a cooling of the material with its conical surface 17 and prevents the material from being further stretched; an annular thickening 18" (FIG. 3) being formed which constitutes a particular bracing against stresses acting in a radial direction of the side walls of the container. There subsequently occurs an elongation and cutting-off of the edge and this may occur before the time at which excess or negative pressure is produced in the interior of the cavity 19 to cause the foil to abut against the side wall and base of the mould. The cutter 13 with the cutting edge 13' exerts a tractive action in the direction of the arrow in FIG. 4 which is rendered possible by the height of the cutting opening (21, 21') which in any case exceeds the thickness of the sheet 18.

Figure 4:
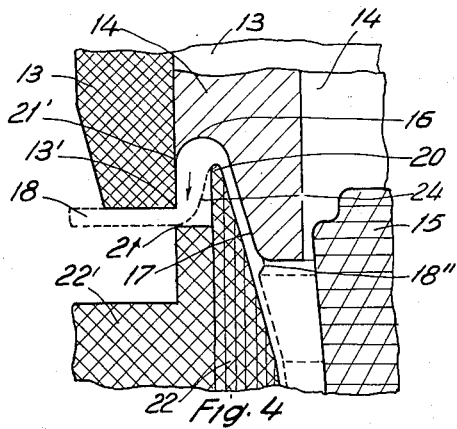

As shown in FIG. 4, the inside surface 24 of the thickened portion which later forms the inside surface of the lip, does not come into contact with the metal parts.

The cutter 13 continues its movement until together with the fixed cutter 22' having a cutting edge 21, it causes the separation of the container from the remaining or surplus sheet, and the lower part of the thickening (FIG. 5) whereupon the thickened portion is no longer subject to an elongating effect and contracts and moves upwards to form the required lip.

It is to be noted that the outer surface 23 of the thickening which, even only for a short period, has come into contact with the cutter 13 tends to maintain a straight line profile, whilst the inside surface 24 which has not come into contact with the metal parts, permits unobstructed contraction of the material. The material therefore tends to form a torus or lip, assumes a curved shape on the inside surface of the lip and at the same time exerts a tractive or pulling effect on the region of the lower apex of the lip.

The container may be ejected from the mould as soon as the clamping element 15 of the upper mould part 14 and the cutter 13 are raised.

For better understanding of FIGS. 1 to 6, FIG. 7 shows a completed container in the form of a cup with side wall 26, a ribbing 27 for bracing the base portion and special grooves 26 to reinforce the upper part, which towards the top has a predetermined slope or bevelling and a lip of full or solid cross-section, which are substantially identical with the corresponding parts in FIG. 6. The portion enclosed by the circle P is reproduced in various alternative embodiments in FIGS. 8 to 12, the development of the edges or rims 28, 29, 30, 32 apparently depending directly upon the given shape of the cutters 22' used as the upsetting tool, the different shapes of which not being shown in the drawings but are conversant to the expert, since they may be readily derived from the final shape of the lip.

I claim:

1. Apparatus for moulding an encircling lip on a thermoplastic upper wall edge defining a top opening of a container, comprising a lower mould part having an upper edge and arranged to abut on the outer surface of the upper wall region of said container, an upper mould part displaceable in an axial direction with respect to said lower mould part, arranged to be displaceable so as to abut on the inside surface of the upper wall region of said container for squeezing material from the upper wall region of said container upwardly beyond said upper edge of said lower mould part, and defining an inverted open recess overlapping said lower mould part and extending around said upper edge thereof for guiding the squeezed material around and downwardly beyond said upper edge of said lower mould part, a normally stationary cutter with a cutting edge located on the outer surface of said lower mould part at an elevation lower than and situated outwardly beyond said upper edge thereof, and an axially displaceable cutter located on an outer rim of said upper mould part and also having a cutting edge, the cutting edge of said stationary cutter and the outer rim of said upper mould part in the position of closest proximity to each other forming a cutting opening the height of which is greater than the thickness of the sheet material from which said container is made.

2. Apparatus as recited in claim 2, wherein, between said cutting opening and the section of the outer surface of said lower mould part located above said stationary cutter, a chamber is formed when said stationary cutter and said upper mould part are closest, the dimension of said chamber in a radial extension being greater than the thickness of said sheet.

3. Apparatus as recited in claim 2 wherein said stationary cutter after severing the sheet is axially displaceable and in which the upper surface thereof adjacent to its cutting edge is formed to act as an upsetting tool.

4. Apparatus as recited in claim 3, wherein the surface of said upper mould part abutting on the upper wall region of said container is curved inwardly at the lower end of said wall region.

* * * * *